(12) United States Patent
Weber et al.

(10) Patent No.: US 7,646,990 B2
(45) Date of Patent: Jan. 12, 2010

(54) CIRCUIT FOR DETECTING OPTICAL FAILURES IN A PASSIVE OPTICAL NETWORK

(75) Inventors: Raviv Weber, Herzliya (IL); Asaf Koren, Herzliya (IL)

(73) Assignee: Broadlight Ltd., Ramat-Gan (IL)

( * ) Notice: Subject to any disclaimer, the term of this patent is extended or adjusted under 35 U.S.C. 154(b) by 506 days.

(21) Appl. No.: 11/514,937

(22) Filed: Sep. 5, 2006

(65) Prior Publication Data
US 2008/0056731 A1    Mar. 6, 2008

(51) Int. Cl.
*H04B 10/04* (2006.01)
*H04J 14/00* (2006.01)

(52) U.S. Cl. .................. 398/197; 398/195; 398/66; 398/71; 372/29.021

(58) Field of Classification Search .................. 398/197, 398/192, 195, 196, 66, 67, 68, 70, 71, 72; 372/29.014, 29.015, 29.021
See application file for complete search history.

(56) References Cited

U.S. PATENT DOCUMENTS

| 6,108,112 | A | 8/2000 | Touma |
|---|---|---|---|
| 6,115,163 | A | 9/2000 | Nobuhara |
| 6,650,839 | B1 | 11/2003 | Mallard, Jr. et al. |
| 7,505,692 | B2 * | 3/2009 | Best .......................... 398/182 |
| 2002/0076143 | A1 | 6/2002 | Foltzer |
| 2002/0097471 | A1 * | 7/2002 | Bethea et al. ............... 359/172 |

OTHER PUBLICATIONS

U.S. Appl. No. 11/512,237, filed Aug. 30, 2006, Schwartsglass et al.

* cited by examiner

*Primary Examiner*—M. R. Sedighian
(74) *Attorney, Agent, or Firm*—Myers Wolin, LLC (57) ABSTRACT

A circuit for detecting optical failures in a passive optical network (PON) wherein digital burst data transmitted by an optical transmitter is monitored by a photodiode, includes a power determination unit coupled to the photodiode for providing measurements of an output optical power of a high logic level and a low logic level of the digital burst data during ON times of the optical transmitter and for providing a measurement of an output optical power during OFF times of the optical transmitter. A logic unit coupled to the power determination unit is responsive to the measurements for generating control and calibration signals. Such a circuit may be used for detecting rogue optical network unit (ONU) failure or eye safety hazards in a passive optical network (PON) wherein digital burst data transmitted by an optical transmitter is monitored by a photodiode.

32 Claims, 7 Drawing Sheets

CIRCUIT FOR DETECTING OPTICAL FAILURES IN A PASSIVE OPTICAL NETWORK

REFERENCES

Patents and Published Applications

| | | |
|---|---|---|
| U.S. Pat. No. 6,650,839 | November 2003 | Mallard, Jr., et al. |
| U.S. Pat. No. 6,115,163 | September 2000 | Nobuhara |
| U.S. Pat. No. 6,108,112 | August 2000 | Touma |
| U.S. 20020076143 | June 2002 | Foltzer |

FIELD OF THE INVENTION

This invention relates generally to passive optical networks, and more particularly to techniques for detecting optical failures in such networks.

BACKGROUND OF THE INVENTION

A passive optical network (PON) is shared between multiple optical network units (ONUs), where each ONU must transmit data to the common channel only during assigned time slots. If these rules of operation are violated, the integrity of the system transmission can be severely compromised.

Figure 1:
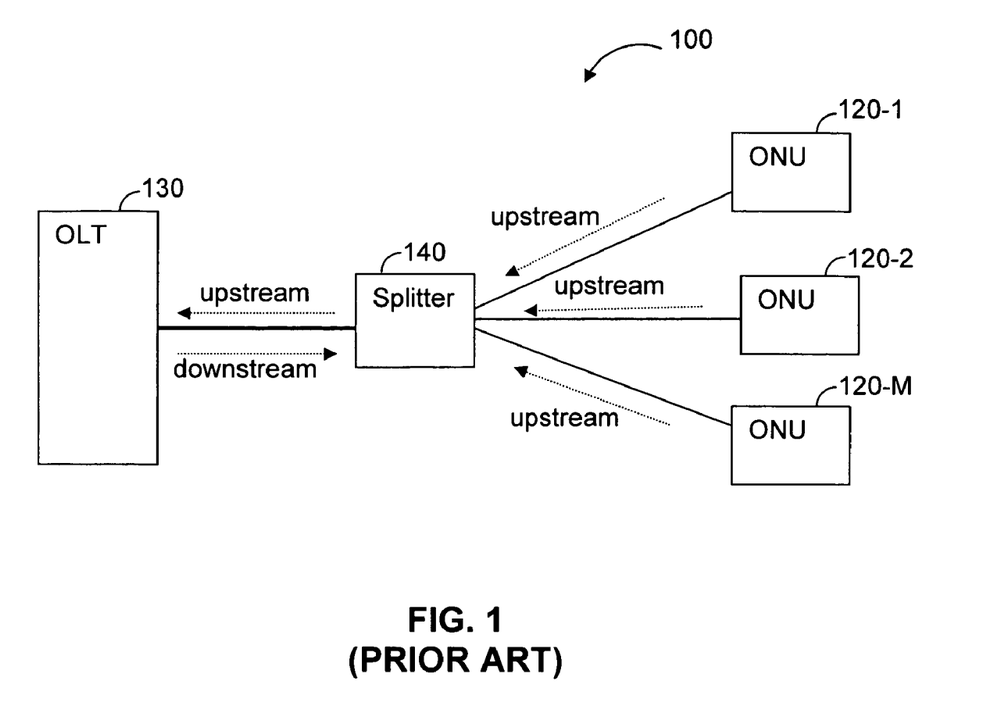
FIG. 1 is an exemplary diagram of a typical prior art PON.

An exemplary diagram of a typical PON 100 is schematically shown in FIG. 1. The PON 100 includes a number M of ONUs 120-1, 120-2, through 120-M, coupled to an optical line terminal (OLT) 130 via a passive optical splitter 140. Since all ONUs function in like manner, they will be collectively referred to by the reference numeral 120 in the following description unless reference is made to a specific ONU. Traffic data transmission may be achieved using ATM cells over two optical wavelengths, one for the downstream direction and another for the upstream direction. Thus, downstream transmission from the OLT 130 is broadcast to all the ONUs 120. Each ONU 120 filters its respective data according to, for example, pre-assigned ATM VPI/VCI values. The OLT 130 transmits downstream data to the ONUs 120 and receives upstream data sent to the OLT 130 from ONUs 120. The OLT 130 broadcasts data to the ONUs 120 along with the shared data so that all the ONUs 120 receive the same data. On the other hand, each of the ONUs 120 transmits respective upstream data to the OLT 130 during different time slots allocated by the OLT 130.

Figure 2:
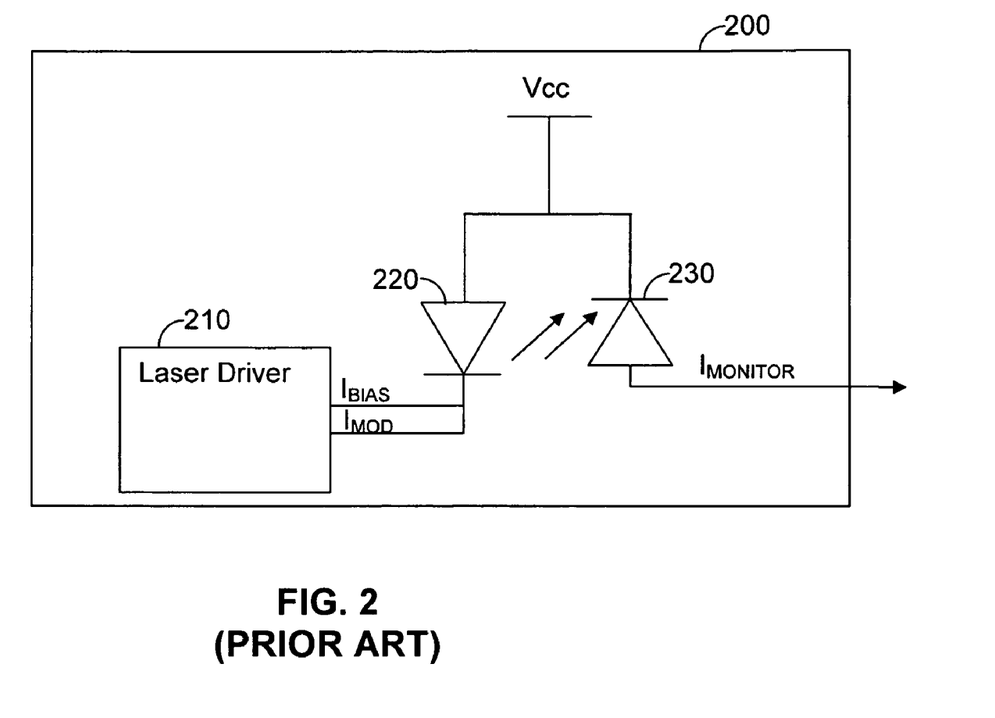
FIG. 2 is an exemplary diagram of a prior art optical transmitter.

The OLT 130 and each of the ONUs 120 include an optical transceiver for transmitting and receiving optical signals that encapsulate the data. FIG. 2 schematically shows a transmitter 200 of an optical transceiver that includes a laser diode driver 210 that drives a laser diode 220, the output signal of which is monitored by a photodiode 230. The photodiode 230 produces a current ($I_{MONITOR}$) in proportion to the amount of light emitted by laser diode 220. The transceiver in each ONU 120 operates in a burst mode, i.e., the laser diode 220 outputs optical signals only during assigned time slots.

It will be understood that during transmission of digital data, the laser diode transmits two logic levels corresponding to logic "high" and logic "low". When the laser diode is ON, the power level of the laser signal varies according to whether logic "high" or logic "low" signals are transmitted. Even when the laser diode is OFF, some residual power is transmitted by the laser diode and so its power level is not exactly zero. Two values are used to control the power level of the output optical signal: average power (AP) and extinction ratio (ER). The AP is the average power of light emitted by the laser diode 220 when high logic level and low logic level signals are transmitted during ON time. The ER is the ratio between light illuminated at "high" and "low" times. That is, $$AP = \frac{(P^{ON}_{Low} + P^{ON}_{High})}{2}; \text{ and}$$

$$ER = \frac{P^{ON}_{Low}}{P^{ON}_{High}}$$

The $P^{ON}_{Low}$ and $P^{ON}_{High}$ are the respective low logic level and high logic level optical power levels during ON time. One type of failure that causes an ONU 120 to always transmit data or noise to the common channel is know as "rogue ONU". This may result from a laser diode 220 that has some radiant power during OFF time. In the related art, techniques for detecting rogue ONU failures are based on measuring the AP and comparing the AP value to a predefined threshold. If that AP exceeds the threshold value, the laser diode 220 is shut down. An example for such technique is disclosed in U.S. Pat. No. 6,650,839 which is incorporated herein by reference for its useful background descriptions of the state of the art heretofore. The disadvantage of the detection of rogue ONU based on the AP is the substantial delay in generating an indication on such failures. This delay results from the time required for measuring the AP value, which is typically done using a low pass filter after the energy in the photodiode 230 is discharged. Another disadvantage of the AP based detection is the inability to determine the power levels of high and low levels at ON times, and to adjust these levels to achieve proper operation of the transmitter 200.

Another type of failures that may be detected by using the AP relate to eye safety hazards. Safety standards demand that optical devices automatically detect such hazards in order to prevent eye injuries resulting from a laser diode transmitting high optical power. This may occur due to an electric short in the laser diode 220 or a disconnected photodiode 230.

It would be advantageous to provide a solution that enables reliable and fast detection of optical failures of PONs.

SUMMARY OF THE INVENTION

The disclosed invention provides a circuit that allows fast and reliable detection of failures in passive optical networks (PONs). In accordance with one embodiment, the present invention detects rogue optical network unit (ONU) failures' based on the power levels during ON and OFF times rather than on the average power produced by a laser diode. In accordance with another embodiment, eye-safety hazards that result from malfunctions in optical transceivers are detected.

According to a first aspect of the invention, there is provided a circuit for detecting optical failures in a passive optical network (PON) wherein digital burst data transmitted by an optical transmitter is monitored by a photodiode, said circuit comprising:

a power determination unit coupled to the photodiode for providing measurements of an output optical power of a high logic level and a low logic level of said digital burst data during ON times of the optical transmitter and for providing a measurement of an output optical power during OFF times of the optical transmitter; and a logic unit coupled to the power determination unit and being responsive to said measurements for generating control and calibration signals.

According to a second aspect of the invention, there is provided a circuit for detecting rogue optical network unit (ONU) failure in a passive optical network (PON) wherein digital burst data transmitted by an optical transmitter is monitored by a photodiode, said circuit comprising:

a power determination unit coupled to an output of a photodiode for providing a measurement of an output optical power during OFF time of the optical transmitter; and a logic unit coupled to the power determination unit and being responsive to generate a control signal for disabling the optical transmitter in a case of a rogue ONU failure.

According to a third aspect of the invention, there is provided a circuit for detecting eye safety hazards in a passive optical network (PON) wherein digital burst data transmitted by an optical transmitter is monitored by a photodiode, said circuit comprising:

a power determination unit coupled to the photodiode for providing measurements of an output optical power of a high logic level and a low logic level of said digital burst data during ON times of the optical transmitter and for providing a measurement of an output optical power during OFF times of the optical transmitter; and a logic unit coupled to the power determination unit and being responsive to said measurements for generating an indication signal indicative of one or more eye safety hazards.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EMBODIMENTS

Figure 3:
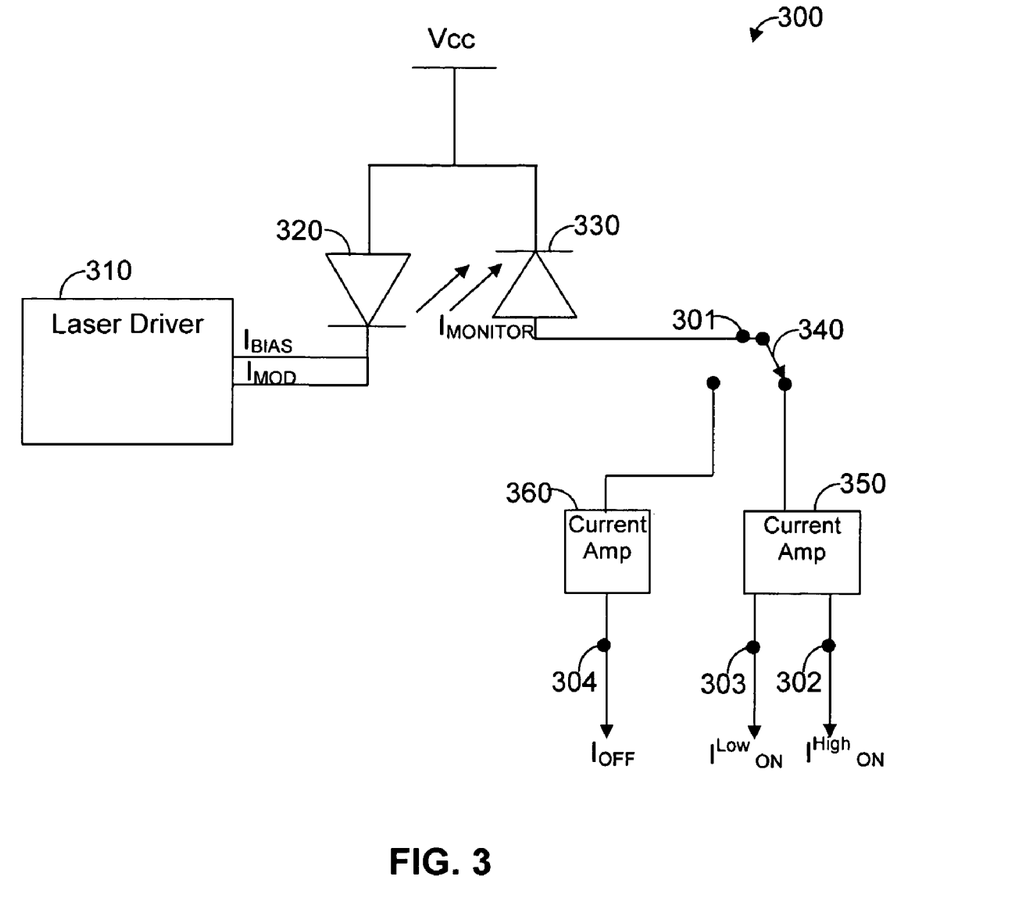
FIG. 3 is a schematic diagram of a circuit for measuring the output optical power level of a laser diode in accordance with the present invention.

FIG. 3 shows an exemplary and non-limiting circuit 300 for measuring the output optical power level of a laser diode in accordance with the principles of the present invention. The circuit 300 includes a laser diode driver 310, a laser diode 320, a photodiode 330, a switch 340, and current amplifiers 350 and 360. The laser diode driver 310 is coupled to the laser diode 320 and produces a bias current $I_{BIAS}$ and a modulation current $I_{MOD}$. The bias current $I_{BIAS}$ is a continuous fixed current that is usually necessary to ensure proper dynamic performance of the laser diode 320. The modulation current $I_{MOD}$ is superimposed on the bias current $I_{BIAS}$ during ON times for producing an optical signal that varies as a function of the modulation current $I_{MOD}$. The laser diode 320 produces optical signals based on the $I_{BIAS}$ and $I_{MOD}$ provided by the laser diode driver 210. Specifically, The $I_{BIAS}$ and $I_{MOD}$ current signals respectively determine the power level of the output signal during OFF and ON times. The laser diode 320 may be, but is not limited to, a Fabry-Perot (FP) laser, a distributed feedback (DFB) laser, and the likes. The photodiode 330 produces current ($I_{MONITOR}$) at an output 301 that is proportional to the amount of light emitted by the laser diode 320.

Figure 4A:
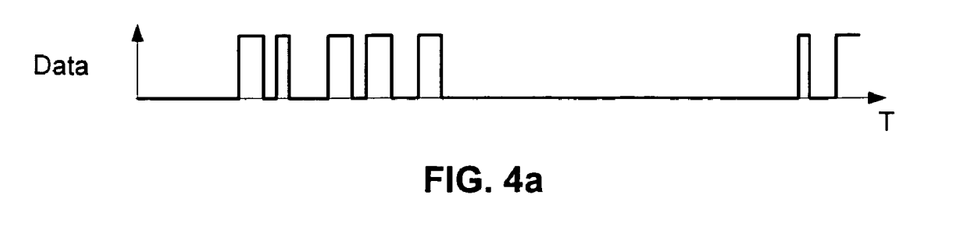
FIGS. 4a, b and c are a series of graphs showing the optical power during ON and OFF times.
Figure 4B:
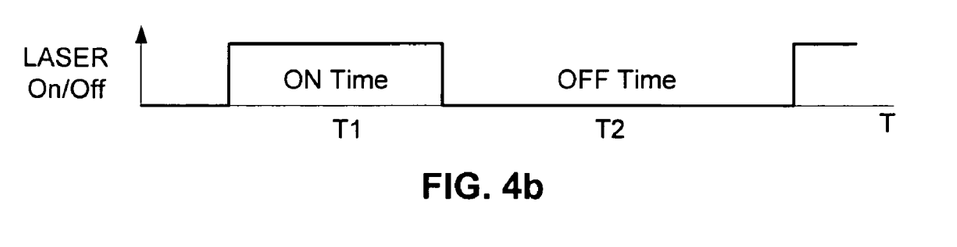
Figure 4C:
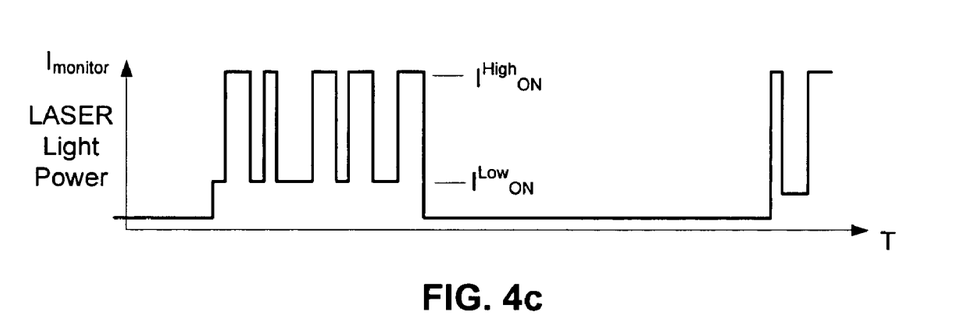

The switch 340 is coupled to an output 301 of the photodiode 330 and can be selectively coupled to either one of the current amplifiers 350 and 360. The current amplifiers 350 and 360 sample the $I_{MONITOR}$ current at the input 301 and provide amplified output current signals. FIG. 4a shows digital data that is transmitted during laser diode ON times shown in FIG. 4b. FIG. 4c shows laser optical power as a function of the measured current $I_{MONITOR}$. The switch 340 is connected to the current amplifier 350 when data is transmitted and the laser diode 320 produces the optimal power. When data is not transmitted the switch 340 is toggled to the current amplifier 360. As shown in FIG. 4c, the current amplifier 350 generates two current signals $I^{High}_{ON}$ and $I^{Low}_{ON}$ providing measurements of high logic and low logic levels of data transmitted during ON time ($T_1$). The current amplifier 360 generates a current signal $I_{OFF}$ of the optical power during OFF time ($T_2$). Thus, the current amplifiers 350 and 360 constitute a power determination unit that determines the power of the laser signal during OFF times and determines separately the power of the laser signal during ON times according to whether logic low or logic high signals are transmitted.

Figure 5:
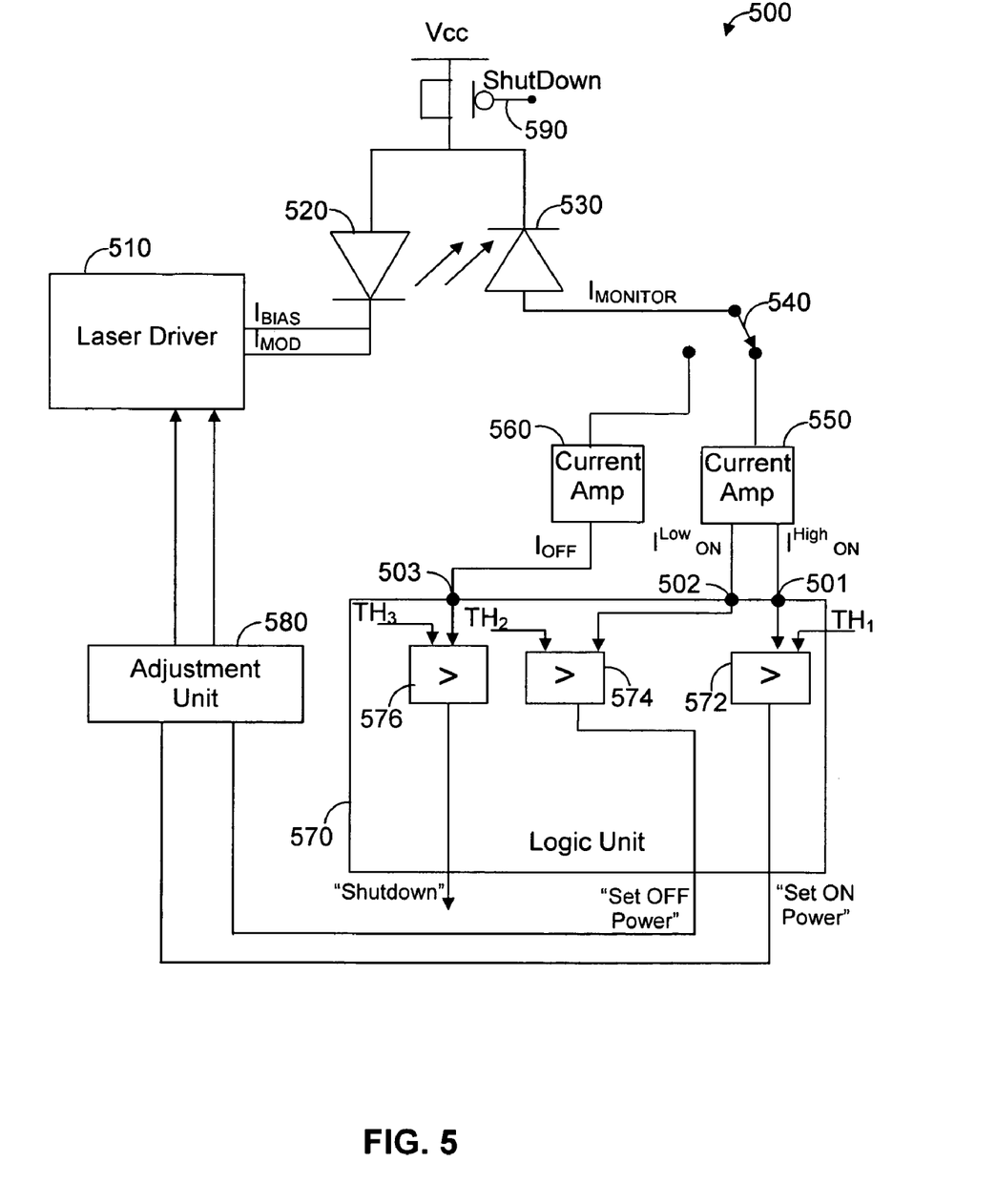
FIG. 5 is a schematic diagram of a circuit for detecting rogue ONU failures in accordance with the present invention.

The outputs 302, 303 and 304 of the current amplifiers 350 and 360 respectively provide the measurements of $I^{High}_{ON}$ and $I^{Low}_{ON}$ and $I_{OFF}$ of the optical power during ON and OFF times. These measurements can be used for calibrating the output power of the laser diode 320 and detecting rogue ONU failures as well as eye safety hazards. A schematic diagram of a circuit 500 utilized for these purposes and constructed in accordance with an embodiment of the present invention is illustrated in FIG. 5. The circuit 500 includes a laser diode driver 510, a laser diode 520, a photodiode 530, a switch 540 and current amplifiers 550 and 560 having the same functionality as described above. The circuit 500 further includes a logic unit 570, an adjustment unit 580 and a switch 590.

The logic unit 570 respectively receives, at inputs 501 and 502, the measured $I^{High}_{ON}$ and $I^{Low}_{ON}$ current signals and, at an input 503, the measured $I_{OFF}$ current and is responsive to the signals at these inputs for generating three respective signals "set ON power", "set OFF power" and "shutdown". The "set ON power" and "set OFF power" signals constitute calibration signals that define the difference between the measured power and a predefined value and allow for calibrating the output optical power of the laser diode 520. The "shutdown" signal constitutes a control signal that controls the switch 590 and enables the laser diode 520 to be disconnected from the power supply if a rogue ONU failure is detected.

The logic unit 570 includes comparators 572, 574 and 576 coupled to respective outputs of the current amplifiers 550 and 560. The comparator 572 compares between the current $I^{High}_{ON}$ at the first output of the current amplifier 550 and a first threshold ($TH_1$). If the $I^{High}_{ON}$ current is greater than the value of $TH_1$, the comparator 572 outputs a high logic value; otherwise, a low logic value is generated. The first threshold determines the expected power level during ON times when high logic level signals are transmitted. Similarly, the comparator 574 compares between the $I^{Low}_{ON}$ current at the second output of the current amplifier 550 and a second threshold ($TH_2$). The second threshold determines the expected power level during ON times when low logic level signals are transmitted. The outputs of comparators 572 and 574 are the "set ON power" and "set OFF power" signals, respectively. The first and second thresholds can be defined according to the average power (AP) and extinction ratio (ER) values that provide the optimal performance of the laser diode 520. The comparator 576 compares between the $I_{OFF}$ current at the output of the current amplifier 560 and a third threshold ($TH_3$), which defines the maximum allowed power level during OFF time. If the value of the $I_{OFF}$ current exceeds $TH_3$ the "shutdown" signal is asserted instructing the switch 590 to disconnect the laser diode 520 from the power supply. Clearly, the shutdown signal can provide an indication of a rogue ONU failure.

The adjustment unit 580 receives the "set ON power" and "set OFF power" signals and adjusts the $I_{MOD}$ and $I_{BIAS}$ currents of the laser diode driver 520. Specifically, the "set ON power" and the "set off power" signals respectively control the $I_{MOD}$ current and $I_{BIAS}$ current. If the setting signal is a high logic value, the adjustment unit 580 increases the respective current signal; otherwise, the current is decreased. Each time that a setting signal is asserted the current is changed by an interval determined by the adjustment unit 580. In order to rapidly equalize the measured power levels to the thresholds, the size of the current interval is reduced over time. The calibration of the $I_{MOD}$ and $I_{BIAS}$ is performed during the operation of the laser diode 520. The adjustment unit 580 is a temperature dependent element ensuring the proper operation of the laser driver 510 and laser diode 520 over a wide range of temperatures. Typically, a temperature dependent element is coupled to a temperature compensation circuit, which adjusts the level of a current source of the element in response to the changes in the temperature. An example for a temperature compensation circuit may be found in U.S. patent application Ser. No. 11/512,237 titled "Method and circuit for providing a temperature dependent current source" filed Aug. 30, 2006 U.S. Pat. No. 7,288,983 assigned to the present assignee and whose contents are wholly incorporated herein by reference.

Figure 6:
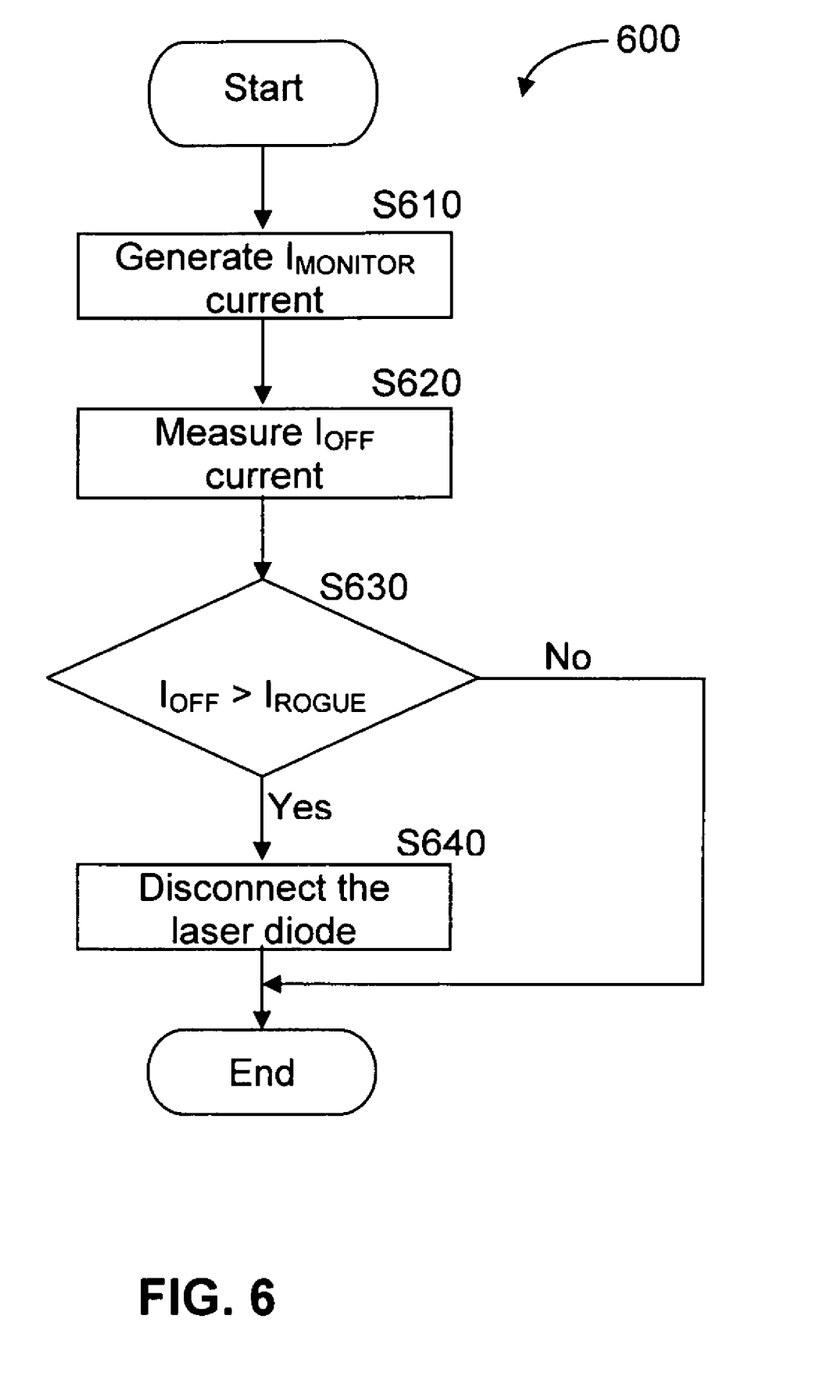
FIG. 6 is a flowchart describing the method for detecting rogue ONU failures in accordance with the present invention.

FIG. 6 shows a non-limiting and exemplary flowchart 600 describing the process for detecting rogue ONU failures in accordance with an embodiment of the present invention. The method may be operated on the circuit 500 described in more detail above. At S610, the optical output power of a laser diode, for example the laser diode 520, is monitored by a light sensitive device, for example the photodiode 530, capable of generating a monitoring current, for example the $I_{MONITOR}$ current. The optical power output, or the light illuminated, by the laser diode is a function of at least the bias and modulation current. At S620, using the monitor current, the power level of the laser diode during OFF times $I_{OFF}$ is measured. This may be preformed by means of a current amplifier, for example the current amplifier 560. At S630, the measured power $I_{OFF}$ is compared to a threshold signal $I_{ROGUE}$ that defines the maximum allowed power during OFF times of the laser diode. If the value of the $I_{OFF}$ signal is above the $I_{ROGUE}$, then at S640 a signal is asserted disconnecting the laser diode from the power supply.

In accordance with an embodiment of the present invention the circuit 300 can be integrated in an eye safety mechanism implemented in an ONU. Generally, two failures in an optical transmitter may cause eye safety hazards: 1) a laser diode constantly emits optical power; and 2) a photodiode is disconnected causing an internal laser power control to increase the optical power to a dangerous level.

Figure 7:
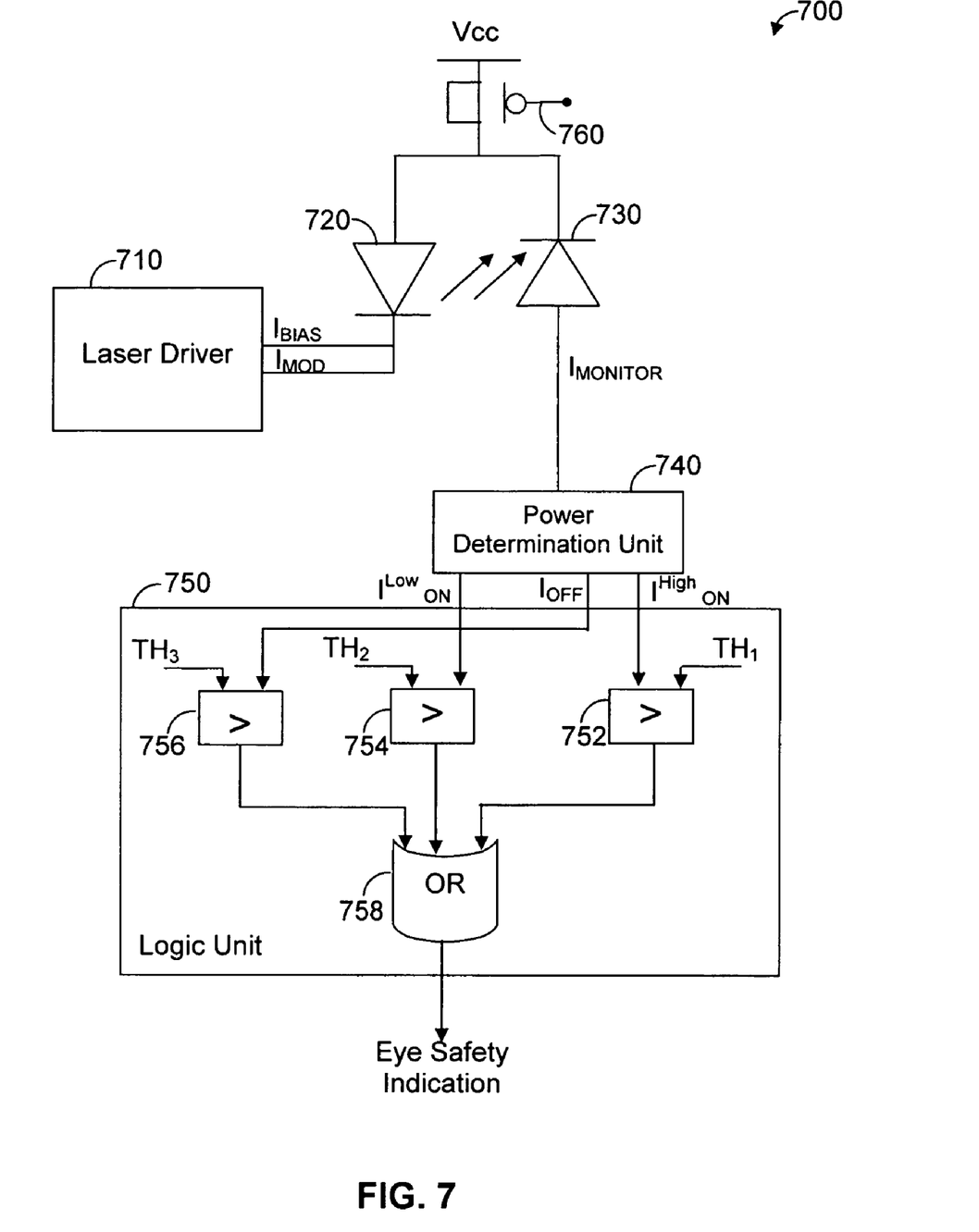
FIG. 7 is a schematic diagram of a circuit for eye safety hazards in accordance with the present invention.

FIG. 7 shows an exemplary and non-limiting diagram of a circuit 700 utilized for detecting eye safety hazards according to the present invention. The circuit 700 is specifically designed to operate in conjunction with burst mode ONUs. The circuit 700 includes a laser driver 710, a laser diode 720 and a photodiode 730, having the same functionality as described above with reference to FIGS. 2 and 3 of the drawings. The output of the photodiode 730 is coupled to a power determination unit 740 that measures power levels ($I^{High}_{ON}$, $I^{Low}_{ON}$ and $I_{OFF}$) of the laser diode 720 during ON and OFF times. This may be done as described above with reference to FIG. 3. A logic unit 750 generates an eye safety indication based on the $I^{High}_{ON}$, $I^{Low}_{ON}$ and $I_{OFF}$ signals. Specifically, the logic unit 750 includes three comparators 752, 754, and 756 as well as an OR gate 758.

The comparator 752 checks whether the photodiode 730 is disconnected by comparing the $I^{High}_{ON}$ current to a first threshold ($TH_1$) and if the $I^{High}_{ON}$ current is less than the value $TH_1$, the comparator 752 outputs a high logic value. The comparison is performed while data is transmitted, i.e., while a TX data signal (provided as an input to the logic unit 750) is asserted. The value of $TH_1$ determines the expected optical power when data is transmitted. The comparators 754 and 756 check whether the laser diode constantly produces optical power. With this aim, comparator 754 compares the $I^{Low}_{ON}$ current to a second threshold ($TH_2$). If during ON times the $I^{Low}_{ON}$ current is greater than the value $TH_2$, the comparator 754 outputs a high logic value. The comparator 756 compares the $I_{OFF}$ current to a third threshold ($TH_3$). If during OFF times the $I_{OFF}$ current exceeds the value of $TH_3$, the comparator 756 asserts a high logic value. The value of $TH_3$ determines the expected optical power during off time, whereas $TH_2$ defines the expected optical power when data when low logic level signals are transmitted during ON time. All thresholds are programmable. The OR gate 758 receives the outputs of the comparators 752, 754 and 756 and asserts an eye safety indication if at least one of the outputs has a high logic value. The eye safety indication may be utilized to disconnect the laser diode 720 from the power supply, for example, by means of a switch 760. In accordance with another embodiment the circuit 700 may include a timer adapted to generate an alarm if none of the above checks were performed during a predefined time interval.

It will be appreciated that although in the above-described embodiments, the current amplifiers 350 and 360 are employed to determine the power of the laser signal during OFF times and to determine separately the power of the laser signal during ON times according to whether logic low or logic high signals are transmitted, other forms of power determination unit may also be used. For example, the power determination unit may employ an operational amplifier (Op-Amp) that is configured to operate as an integrator, a sample and hold circuit, a buffer, and the likes.

The invention claimed is:

1. A circuit for detecting optical failures in a passive optical network (PON) wherein digital burst data transmitted by an optical transmitter is monitored by a photodiode, said circuit comprising:

a power determination unit coupled to the photodiode for providing measurements of an output optical power of a high logic level and a low logic level of said digital burst data during ON times of the optical transmitter and for providing a measurement of an output optical power during OFF times of the optical transmitter, wherein the power determination unit comprises a first power determination unit and a second power determination unit for providing measurements of the output optical power during ON and OFF times of the optical transmitter, respectively, and further comprising a switch coupled to the photodiode for switchably coupling the photodiode to either the first power determination unit or to the second power determination unit; and a logic unit coupled to the power determination unit and being responsive to said measurements for generating control and calibration signals.

2. The circuit of claim 1, wherein the optical transmitter includes a laser diode.

3. The circuit of claim 2, wherein the switch is coupled to the first power determination unit during the ON time of the laser diode.

4. The circuit of claim 3, wherein the first power determination unit samples a current signal produced by the photodiode during the ON time of the optical transmitter.

5. The circuit of claim 4, wherein the switch is toggled to the second power determination unit during the OFF time of the optical transmitter.

6. The circuit of claim 5, wherein the second power determination unit samples a current signal produced by the photodiode during the OFF time of the optical transmitter.

7. The circuit of claim 1, wherein the logic unit comprises: a first comparator for generating a first calibration signal for adjusting a modulation current of the laser diode; a second comparator for generating a second calibration signal for adjusting a bias current of the laser diode; and a third comparator for generating a control signal indicating on at least a rogue optical network unit (ONU) failure.

8. The circuit of claim 7, being adapted to generate the first calibration signal by comparing the measurement of the optical power of the high logic level during the ON time to a first threshold.

9. The circuit of claim 7, being adapted to generate the second calibration signal by comparing the measurement of the optical power of the low logic level during the ON time to a second threshold.

10. The circuit of claim 9, being adapted to determine the first threshold and the second threshold according to an average power and an extinction ratio of the laser diode.

11. The circuit of claim 9, being adapted to generate the control signal by comparing the measurement of the power level during off time to a third threshold so as to provide an indication of at least a rogue ONU failure.

12. The circuit of claim 11, wherein the third threshold defines the maximum allowed power level during OFF time.

13. The circuit of claim 12, being responsive to the control signal for disconnecting the laser diode.

14. A circuit for detecting rogue optical network unit (ONU) failure in a passive optical network (PON) wherein digital burst data transmitted by an optical transmitter is monitored by a photodiode, said circuit comprising:

a power determination unit coupled to an output of a photodiode for providing a measurement of an output optical power during OFF time of the optical transmitter; and a logic unit coupled to the power determination unit and being responsive to generate a control signal for disabling the optical transmitter in a case of a rogue ONU failure, wherein the logic unit comprises a comparator for generating the control signal indicative of at least a rogue ONU failure.

15. The circuit of claim 14, further comprising a switch switchably coupled between the photodiode and the power determination unit.

16. The circuit of claim 15, wherein the photodiode is coupled to a laser diode in the optical transmitter.

17. The circuit of claim 16, wherein the switch is toggled to the power determination unit during an OFF time of the laser diode.

18. The circuit of claim 17, wherein the power determination unit samples a current signal produced by the photodiode during the off time.

19. The circuit of claim 14, wherein the control signal is generated by comparing the measurement of the power level during OFF time of the optical transmitter to a rogue threshold.

20. The circuit of claim 19, wherein the rogue threshold defines the maximum allowed power level during OFF time of the optical transmitter.

21. A circuit for detecting eye safety hazards in a passive optical network (PON) wherein digital burst data transmitted by an optical transmitter is monitored by a photodiode, said circuit comprising:

a power determination unit coupled to the photodiode for providing measurements of an output optical power of a high logic level and a low logic level of said digital burst data during ON times of the optical transmitter and for providing a measurement of an output optical power during OFF times of the optical transmitter, wherein the power determination unit comprises a first power determination unit and a second power determination unit for providing measurements of the output optical power during ON and OFF times of the optical transmitter, respectively, and further comprising a switch coupled to the photodiode for switchably coupling the photodiode to either the first power determination unit or to the second power determination unit; and a logic unit coupled to the power determination unit and being responsive to said measurements for generating an indication signal indicative of one or more eye safety hazards.

22. The circuit of claim 21, wherein the optical transmitter includes a laser diode.

23. The circuit of claim 22, being operative to detect eye safety hazards caused by at least one of: the laser diode constantly emitting optical power and a disconnected photodiode.

24. The circuit of claim 21, wherein the switch is coupled to the first power determination unit during the ON time of the laser diode.

25. The circuit of claim 24, wherein the first power determination unit samples a current signal produced by the photodiode during the ON time of the optical transmitter.

26. The circuit of claim 25, wherein the switch is toggled to the second power determination unit during the OFF time of the optical transmitter.

27. The circuit of claim 26, wherein the second power determination unit samples a current signal produced by the photodiode during the OFF time of the optical transmitter.

28. The circuit of claim 21, wherein the logic unit comprises:

a first comparator for generating a first indication signal if the measurement of the high logic level during the ON time of the optical transmitter is greater than a first threshold;

a second comparator for generating a second indication signal if the measurement of the power level during OFF time of the optical transmitter exceeds a third threshold;

a third comparator for generating a third indication signal if the measurement of the low logic level during the ON time of the optical transmitter is greater than a second threshold; and an OR gate for generating the indication signal if at least one of the first indication signal, the second indication signal and the third indication signal is asserted.

29. The circuit of claim 28, wherein the first threshold determines an expected optical power when burst data is transmitted during ON time of the optical transmitter.

30. The circuit of claim 28, wherein the third threshold determines an expected optical power during OFF time of the optical transmitter.

31. The circuit of claim 28, wherein the second threshold determines an expected optical power when burst data is not transmitted during ON time of the optical transmitter.

32. The circuit of claim 21, being responsive to the indication signal for disabling the optical transmitter.

* * * * *